(12) United States Patent
Imaoka (10) Patent No.: US 9,838,666 B2
(45) Date of Patent: Dec. 5, 2017

(54) VIDEO DECODING DEVICE AND IMAGE DISPLAY DEVICE

(75) Inventor: Ren Imaoka, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 593 days.

(21) Appl. No.: 13/571,334

(22) Filed: Aug. 9, 2012

(65) Prior Publication Data

US 2013/0038687 A1    Feb. 14, 2013

(30) Foreign Application Priority Data

Aug. 12, 2011   (JP) .................................. 2011-176796

(51) Int. Cl.
| | |
|---|---|
| H04N 13/00 | (2006.01) |
| H04N 19/597 | (2014.01) |
| H04N 19/513 | (2014.01) |
| H04N 19/132 | (2014.01) |
| H04N 19/44 | (2014.01) |
| H04N 19/625 | (2014.01) |

(52) U.S. Cl.
CPC ....... *H04N 13/0048* (2013.01); *H04N 19/132* (2014.11); *H04N 19/44* (2014.11); *H04N 19/513* (2014.11); *H04N 19/597* (2014.11); *H04N 19/625* (2014.11)

(58) Field of Classification Search
None
See application file for complete search history.

(56) References Cited

U.S. PATENT DOCUMENTS

| | | | |
|---|---|---|---|
| 6,577,256 B2 | 6/2003 | Kimura et al. | |
| 6,917,651 B1* | 7/2005 | Yoo et al. | ............... 375/240.24 |
| 7,650,036 B2 | 1/2010 | Lei et al. | |
| (Continued) | | | |

FOREIGN PATENT DOCUMENTS

| | | |
|---|---|---|
| JP | 2002-034047 A | 1/2002 |
| JP | 2005-124200 A | 5/2005 |

(Continued)

OTHER PUBLICATIONS

Office Action for related Japanese Application No. 2011-176796, dated Feb. 5, 2015.

*Primary Examiner* — Andy Rao
*Assistant Examiner* — Samuel D Fereja
(74) *Attorney, Agent, or Firm* — Shapiro, Gabor and Rosenberger, PLLC (57) ABSTRACT

To efficiently provide 2-dimensional display of a 3-dimensional video Stream.
A video decoding device 100 includes a macro block selector 103 for sequentially selecting, as objects to be decoded, macro blocks belonging to a range required for 2-dimensional display, and a decoding unit 100 for sequentially decoding macro blocks selected by the macro block selector. Furthermore, the video decoding device includes a motion vector shift unit 108 for correcting, when a motion vector of a macro block selected by the macro block selector is referring to outside the range required for the 2-dimensional display, the reference indicated by the motion vector to be within the range required for the 2-dimensional display. Since the macro block selector performs block selection, the decoding unit skips processing of macro blocks which are not supposed to be 2-dimensionally displayed.

12 Claims, 8 Drawing Sheets

(56) References Cited

U.S. PATENT DOCUMENTS

| | | | |
|---|---|---|---|
| 8,811,473 B2 | 8/2014 | Amano | |
| 2005/0254010 A1* | 11/2005 | Kato et al. | 352/59 |
| 2006/0153289 A1* | 7/2006 | Choi | H04N 19/597 375/240.01 |
| 2009/0185029 A1 | 7/2009 | Mitsuhashi et al. | |
| 2010/0271465 A1* | 10/2010 | Lee | H04N 13/0048 348/51 |
| 2010/0309286 A1* | 12/2010 | Chen | H04N 13/0059 348/43 |
| 2010/0315493 A1 | 12/2010 | Hamada | |
| 2010/0321583 A1* | 12/2010 | Shields | G06T 7/20 348/699 |
| 2010/0329640 A1* | 12/2010 | Okada et al. | 386/252 |
| 2011/0058016 A1* | 3/2011 | Hulyalkar | H04N 13/0029 348/42 |
| 2011/0157309 A1* | 6/2011 | Bennett | G06F 3/14 348/43 |
| 2011/0211635 A1* | 9/2011 | Amano | 375/240.02 |
| 2011/0242294 A1 | 10/2011 | Noguchi | |
| 2011/0280316 A1* | 11/2011 | Chen et al. | 375/240.25 |
| 2011/0292176 A1* | 12/2011 | Jung et al. | 348/43 |
| 2012/0026287 A1* | 2/2012 | Tsukagoshi | H04N 13/0029 348/43 |
| 2012/0033039 A1* | 2/2012 | Sasaki | H04N 13/0029 348/43 |
| 2013/0201282 A1* | 8/2013 | Ballocca | H04N 13/0022 348/43 |

FOREIGN PATENT DOCUMENTS

| | | | |
|---|---|---|---|
| JP | 2008-42645 A | 2/2008 | |
| JP | 2010-34704 A | 2/2010 | |
| JP | 2010-288234 A | 12/2010 | |
| JP | 2011-14956 A | 1/2011 | |
| WO | 2011/004551 A1 | 1/2011 | |
| WO | 2011/061973 A1 | 5/2011 | |
| WO | WO 2011055674 A1 * | 5/2011 | H04N 13/0029 |

\* cited by examiner

VIDEO DECODING DEVICE AND IMAGE DISPLAY DEVICE

CROSS-REFERENCE TO RELATED APPLICATION

The disclosure of Japanese Patent Application No. 2011-176796 filed on Aug. 12, 2011 including the specification, drawings and abstract is incorporated herein by reference in its entirety.

BACKGROUND

The present invention relates to a technique for decoding a 3-dimensional video Stream having a right-eye macro block group including a plurality of macro blocks for forming a right-eye image and a left-eye macro block group including a plurality of macro blocks for forming a left-eye image, formed on a same frame.

Patent document 1 (Japanese Patent Laid-Open No. 2005-124200) describes a technique for displaying on a conventional 2-dimensional display by decoding only one of the views of a compressed 3-dimensional or stereo view (specification paragraphs 0083 to 0085).

Patent document 2 (Japanese Patent Laid-Open No. 2011-014956) describes a technique for converting a 3-dimensional video stream into a 2-dimensional video stream by searching the 3-dimensional video stream to extract only a stream on one side and only by rewriting the header information (specification paragraphs 0018 to 0019).

Patent document 3 (Japanese Patent Laid-Open No. 2008-042645) describes a technique for reproducing an image having stored therein a 2D (2-dimensional) image and a 3D (3-dimensional) image in a coexisting manner (specification paragraph 0001).

Patent document 4 (Japanese Patent Laid-Open No. 2010-288234) describes a technique for reproducing the coexistence of a 3-dimensional video image and a 2-dimensional video image, depending on the function of the receiving device (specification paragraph 0006).

Patent document 5 (Japanese Patent Laid-Open No. 2010-034704) described a technique for converting a side-by-side 3-dimensional image into a 2-dimensional image (specification paragraph 0076-0078).

SUMMARY

As described above, 2-dimensional display can be performed by decoding all the frames of a 3-dimensional video stream and subsequently reproducing only the left-eye image in an enlarged manner. However, the inventors of the present application have found that decoding all frames and subsequently extracting and reproducing the left-eye image require decoding of the right-eye image which is not necessary for display, which takes a long time and requires extra memory space for decoding.

It is an object of the invention to provide a technique for efficiently performing 2-dimensional display of a 3-dimensional video stream.

The Other purposes and the new feature of the present invention will become clear from the description of the present specification and the accompanying drawings.

The following explains briefly the outline of a typical invention among the inventions disclosed in the present application.

That is, in a video decoding device which decodes a 3-dimensional video stream having a right-eye macro block group including a plurality of macro blocks for forming a right-eye image, and a left-eye macro block group including a plurality of macro blocks for forming a left-eye image formed on a same frame, a macro block selector is provided for sequentially selecting, as objects to be decoded, macro blocks belonging to a range required for 2-dimensional display. In addition, the video decoding device has provided thereto a decoding unit for sequentially decoding macro blocks selected by the macro block selector, and a motion vector shift unit for correcting, if a motion vector of a macro block selected by the macro block selector is referring to outside the range required for the 2-dimensional display, the reference indicated by the motion vector to be within the range required for the 2-dimensional display.

The following explains briefly the effect acquired by the typical invention among the inventions disclosed in the present application.

That is, 2-dimensional display of a 3-dimensional video stream can be efficiently provided.

DETAILED DESCRIPTION

1. Outline of Embodiments

First, the following explains briefly the outline of a typical embodiment of the inventions disclosed in the present application. Reference numerals of the drawings referred to in the outline explanation of representative embodiments in a parenthesized manner are only illustrative of what are included in the concept of the components to which they are provided.

[1] A video decoding device (100) according to a representative embodiment of the invention decodes 3-dimensional video stream having a right-eye macro block group including a plurality of macro blocks for forming a right-eye image, and a left-eye macro block group including a plurality of macro blocks for forming a left-eye image formed on a same frame. The video decoding device includes a macro block selector (103) for sequentially selecting, as objects to be decoded, macro blocks belonging to a range required for 2-dimensional display, a decoding unit (110) for sequentially decoding macro blocks selected by the macro block selector, and a motion vector shift unit (108) for correcting, if a motion vector of a macro block selected by the macro block selector is referring to outside the range required for the 2-dimensional display, the reference indicated by the motion vector to be within the range required for the 2-dimensional display.

According to the configuration described above, since the macro block selector performs block selection, the decoding unit skips processing of macro blocks which are not supposed to be 2-dimensionally displayed. Accordingly, decoding time can be reduced by about ½ in comparison with the case of reproducing only the left-eye image after decoding all the frames, whereby 2-dimensional display of a 3-dimensional video stream can be efficiently performed. In addition, in a case where decoding of macro blocks is skipped by selecting blocks in the macro block selector, image degradation caused by reference to an undecoded region can be avoided by shifting and correcting the motion vector.

[2] In the item [1], the decoding unit may include an inverse quantizer (104) which performs inverse quantization, an inverse discrete cosine transformer (105) which performs inverse discrete cosine transformation on the output of the inverse quantizer, a motion compensator (109) which extracts decoded data to acquire a predicted image, and an adder (106) for adding the output of the motion compensator to the output of the inverse discrete cosine transformer.

[3] In the item [2], the macro block selector may be configured to determine whether an input 3-dimensional video stream has been encoded in a side-by-side system or a top-and-bottom system, and in accordance with the determination result, specify a range required for 2-dimensional display, and sequentially select, as objects to be decoded, macro blocks belonging to the range.

[4] In the item [3], the motion vector shift unit may perform first determination processing to determine whether or not a motion vector of a macro block selected by the macro block selector is referring to a macro block for forming a right-eye image. In addition, the motion vector shift unit may perform second determination processing to determine whether or not the input 3-dimensional video stream has been encoded in a side-by-side system or a top-and-bottom system, in the case where the motion vector of the macro block selected by the macro block selector is referring to a macro block for forming a right-eye image. Furthermore, the motion vector shift unit may correct, in accordance with result of the first determination processing and the second determination processing, the reference indicated by the motion vector to be within a range required for the 2-dimensional display.

[5] In the item [4], a variable-length decoder (102) may be disposed in a preceding stage of the macro block selector for performing variable-length decoding processing in which partitions of the macro block can be analyzed.

[6] In the item [5], an image display device (10) may include the video decoding device (100) and a display unit (400) capable of performing 2-dimensional display of the decoding result of the video decoding device.

2. Details of Embodiments

Embodiment will be further described in detail.

First Embodiment

Figure 1:
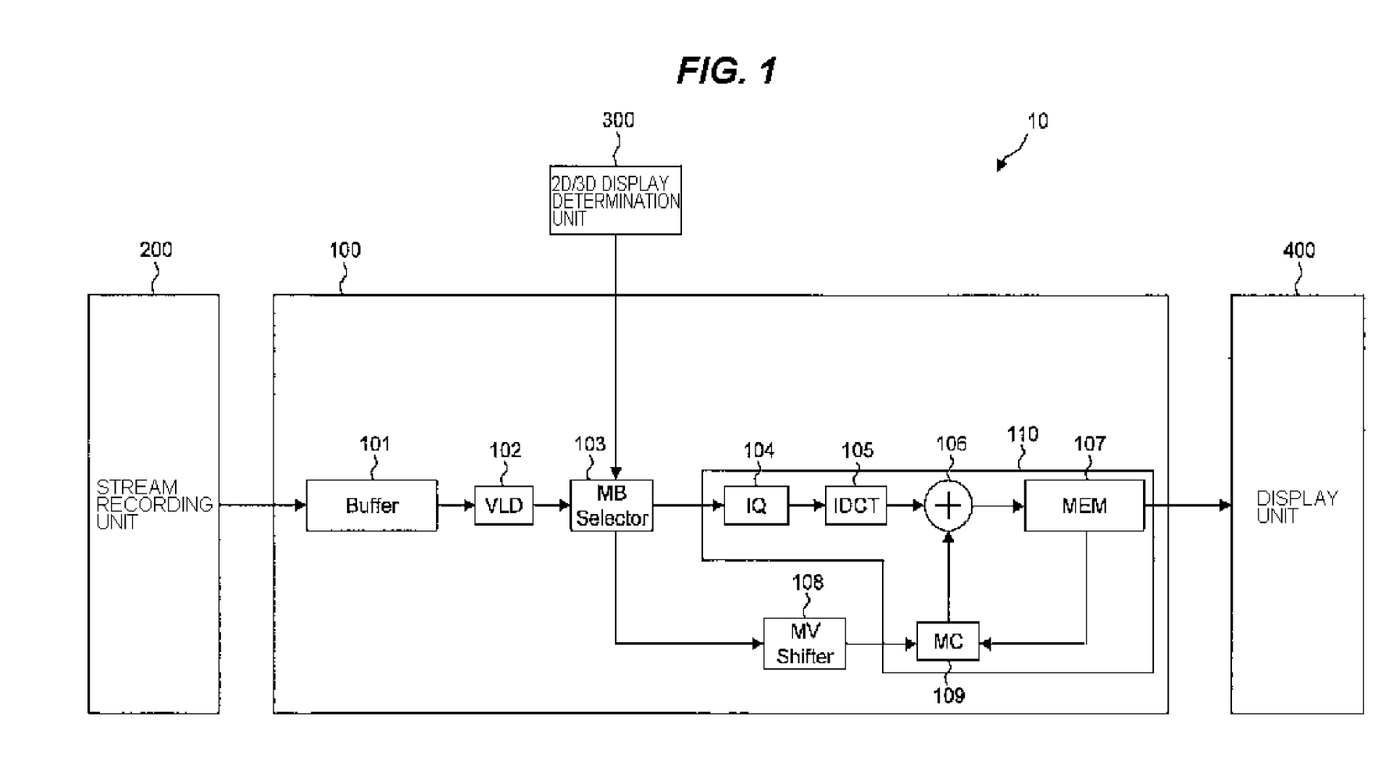
FIG. 1 is a block diagram of an exemplary configuration of the image display device according to the present invention.

FIG. 1 illustrates an exemplary configuration of the image display device according to the invention.

Figure 5:
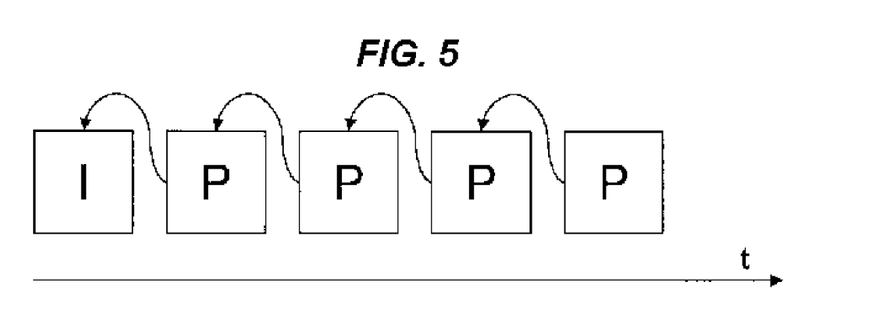
FIG. 5 is an explanatory diagram of frame reference in the decoding processing of a 3-dimensional video stream.

The image display device 10 shown in FIG. 1 can decode and display a 3-dimensional video stream encoded by a compression algorithm based on MPEG (Moving Picture Experts Group)-4. As a compression algorithm based on MPEG-4, space conversion, intra-frame prediction, quantization or the like is employed. Discrete cosine transformation is used for space conversion. For example, a DCT coefficient of the original image or a predicted error image of an intra-frame prediction is obtained with a macro block of 8×8 pixels being a unit, and the coefficient is quantized. For example, encoding with a P-frame is performed by making use of a single image from a frame located anterior in the time axis, whereas encoding with a B-frame is performed by making use of two, i.e., anterior and posterior images. In order to display an image which has been encoded in this manner, decoding processing is required. In the decoding processing, P-frames are sequentially referred to along the time axis t as shown in FIG. 5, for example.

The image display device 10 shown in FIG. 1 is mounted on a cellular phone or a digital video camera, although not being particularly limited thereto, and includes a video decoding device 100, a stream recording unit 200, a 2D/3D display determination unit 300, and a display unit 400. The stream recording unit 200 is assumed to be a semiconductor memory, and the semiconductor memory has a 3-dimensional video stream recorded therein. The 3-dimensional video stream is encoded in a side-by-side system or in a top-and-bottom system.

The video decoding device 100 has a function of decoding a 3-dimensional video stream taken in from the stream recording unit 200. The video decoding device 100 has a 2D/3D control signal input thereto from the 2D/3D display determination unit 300. When 2-dimensional-display is specified by the 2D/3D control signal, the video decoding device 100 performs decoding processing for 2-dimensional display. When 3-dimensional display is specified by the 2D/3D control signal, the video decoding device 100 performs decoding processing for 3-dimensional display.

The video decoding device 100 includes a Buffer 101, variable length decoder (VLD) 102, a macro block selector (MB Selector) 103, a macro block shifter (MB Shifter) 108, and a decoding unit 110.

A 3-dimensional video stream is transferred from the stream recording unit 200 to the Buffer 101. The 3-dimensional video stream stored in a Buffer 31 is supplied to the variable-length decoder 102. In the variable-length decoder 102, predicted residual components of color and brightness of a plurality of blocks included in a picture are decoded from the input 3-dimensional video stream. It should be noted that the boundary between macro blocks is clarified by the decoding processing.

In accordance with 2D/3D control signal from the 2D/3D display determination unit 300, the macro block selector 103 selects a corresponding block for an output signal from the variable-length decoder 102. That is, when 2-dimensional display is instructed by the 2D/3D control signal which can selectively instruct 2-dimensional display or 3-dimensional display, a range required for the 2-dimensional display is specified, and predicted residual components of color and brightness are sequentially selected for macro blocks belonging to the range and supplied to the decoding unit 110 at a subsequent stage. At this time, predicted residual components of color and brightness for macro blocks which have not been selected by the macro block selector 103 are not supplied to the decoding unit 110.

The motion vector shifter 108 decodes a motion vector of a macro block of a picture from a 3-dimensional video stream. In addition, the motion vector shifter 108 determines whether or not a motion vector of a macro block selected by the macro block selector is referring to a macro block for forming a right-eye image. Furthermore, the motion vector shifter 108 determines whether or not the input 3-dimensional video stream has been encoded in side-by-side system or a top-and-bottom system, in the case where the motion vector of the macro block selected by the macro block selector is referring to a macro block for forming a right-eye image and corrects, in accordance with determination result, the reference indicated by the motion vector within a range required for 2-dimensional display. The correction will be described in detail below.

The decoding unit 110 includes an inverse quantizer (IQ) 104, an inverse discrete cosine transformer (IDCT) 105, an adder 106, a memory (MEM) 107, and a motion compensator (MC) 109.

Predicted residual components of color and brightness for macro blocks selected by the macro block selector 103 are subject to inverse quantization by the inverse quantizer 104, subject to inverse cosine transformation by the inverse discrete cosine transformer 105, and then supplied to the adder 106. The output of the adder 106 is written into a memory 107 at a subsequent stage.

When the picture type is I-picture in which no intra-frame prediction is performed, data of the macro blocks are stored in the memory 107 as-is. In contrast to this, when the picture type is P-picture or B-picture accompanied with intra-frame prediction, the data of macro blocks has information of the motion vector added thereto, and thus, after the motion compensator 109 has extracted the decoded data in the memory 107 and acquired a predicted image based on the motion vector data supplied from the variable-length decoder 102, image data having difference data added thereto and motion-compensated by the adder 106 is acquired. That is, the motion compensator 109 performs motion compensation by forming a predicted image of a macro block for motion compensation, which is supplied to the adder 106, and added to the output of the inverse discrete cosine transformer 105. In this manner, a motion-compensated video signal is provided in the memory 107. The video signal is transferred to and displayed on the display unit 400.

Figure 4:
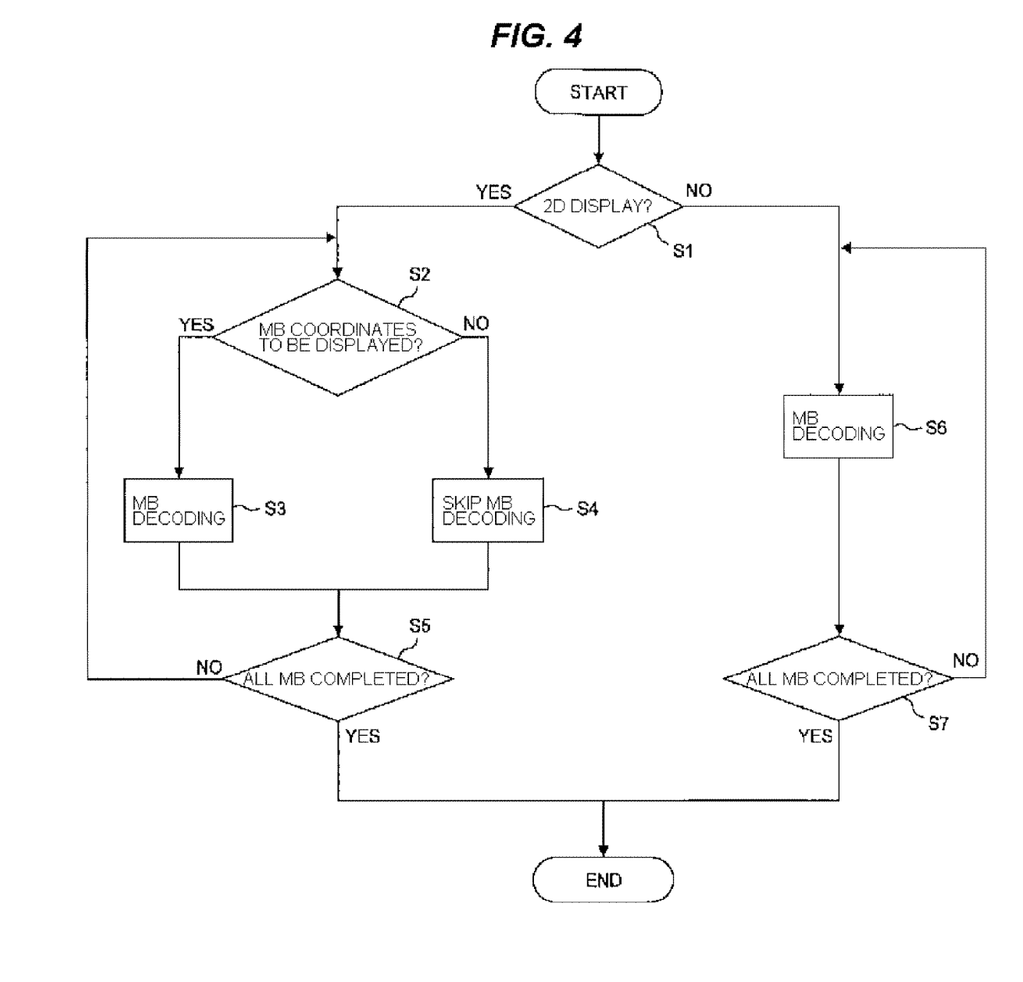
FIG. 4 is a flow chart of a main operation in the video decoding device.

FIG. 4 illustrates a flow chart of the main operation in the video decoding device 100.

The 2D/3D display determination unit 300 determines whether or not 2-dimensional display is specified (S1). When 2-dimensional display is specified in the determination (YES), the macro block selector 103 determines whether or not MB (macro block) coordinates are supposed to be displayed (S2). When it is determined that MB (macro block) coordinates are supposed to be displayed (YES), decoding of the macro block (MB) is performed (S3). When, however, it is determined that MB coordinates are not supposed to be displayed (NO), decoding of the MB is skipped (S4). When determination at step S2 has been made for all the macro blocks, the processing is completed (S5). In addition, when it is determined at step S1 that 2-dimensional display is not specified (NO), all the MB are subjected to decoding, for 3-dimensional display (S6, S7).

The processing at step S3 differs between the case where the input 3-dimensional video stream has been encoded in a side-by-side system and the case where it has been encoded in a top-and-bottom system.

Figure 2:
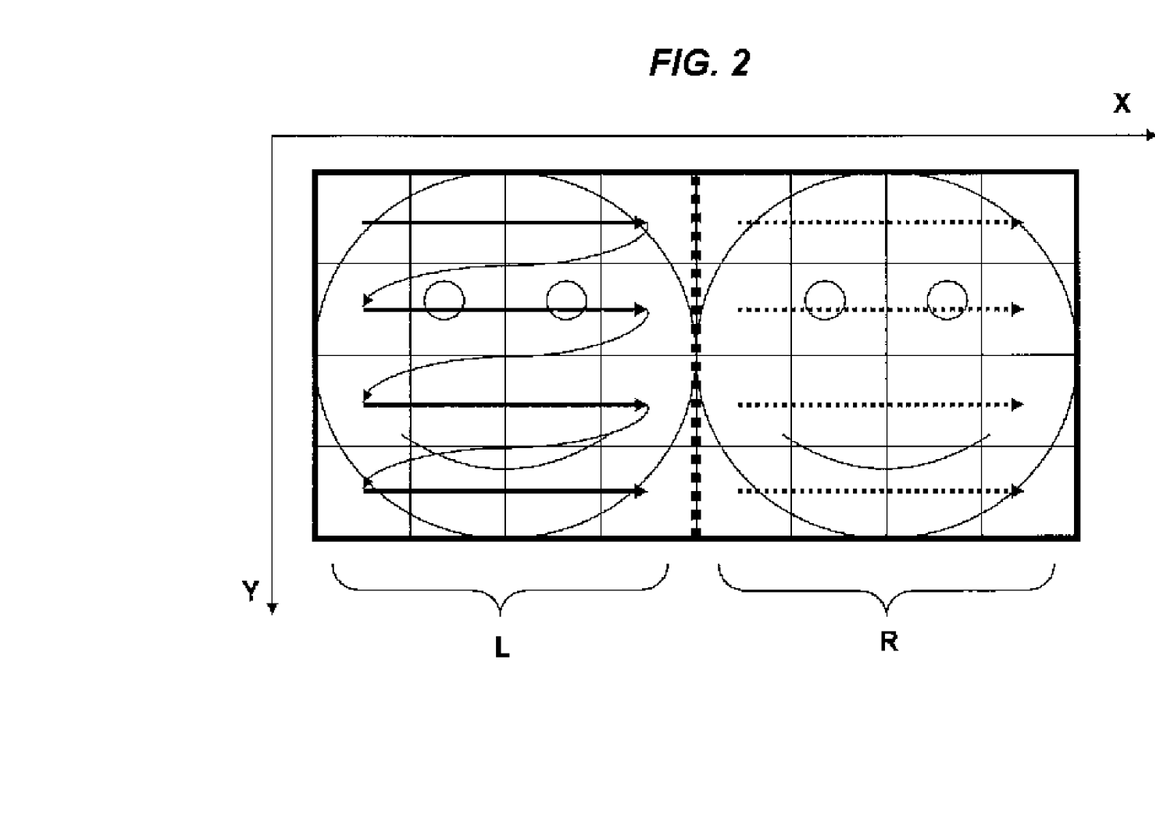
FIG. 2 is an explanatory diagram of decoding processing for the side-by-side system.

When, for example, the input 3-dimensional video stream has been encoded in a side-by-side system, the processing is performed as shown in FIG. 2. Here, for convenience of illustration, the image size including the L (left) image and the R (right) image is assumed to be 8×4 (number of horizontal MB=8, number of vertical MB=4). In this case, the horizontal line is traced back each time four horizontal MB have been decoded as shown by thick arrows, and thus only the L-region is decoded. The R-region is not decoded.

Figure 3:
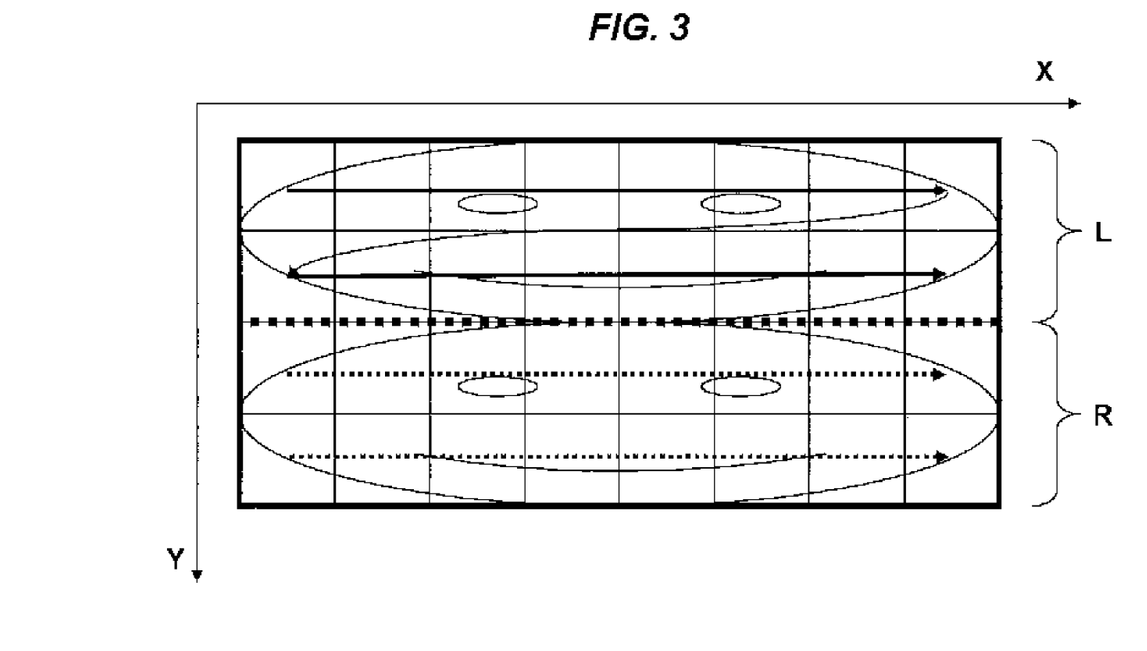
FIG. 3 is an explanatory diagram of decoding processing for a top-and-bottom system.

In contrast, if the input 3-dimensional video stream has been encoded in a top-and-bottom system, only the L-region is decoded by terminating the decoding when all the horizontal MB for two lines have been decoded, as shown in FIG. 3. The R-region is not decoded.

Here, if a viewer selected 2-dimensional display of a 3-dimensional video stream, the motion vector is checked by the motion vector shifter 108. The motion vector referring to a region which has already been decoded is supplied to the compensator 109 as is without conversion. However, for a motion vector referring to a region (macro block) which has not been selected by the macro block selector 103, predicted image (equivalent to a P-frame or B-frame) indicated by the original motion vector cannot be referred to, and thus the macro block shifter 108 compensates the motion vector by shifting it so as to refer to the already decoded region regarded as most resembling the predicted image indicated by the original motion vector. At this time, the shift method is determined through the use of 3-dimensional format information acquired from the variable-length decoder 102.

Figure 8:
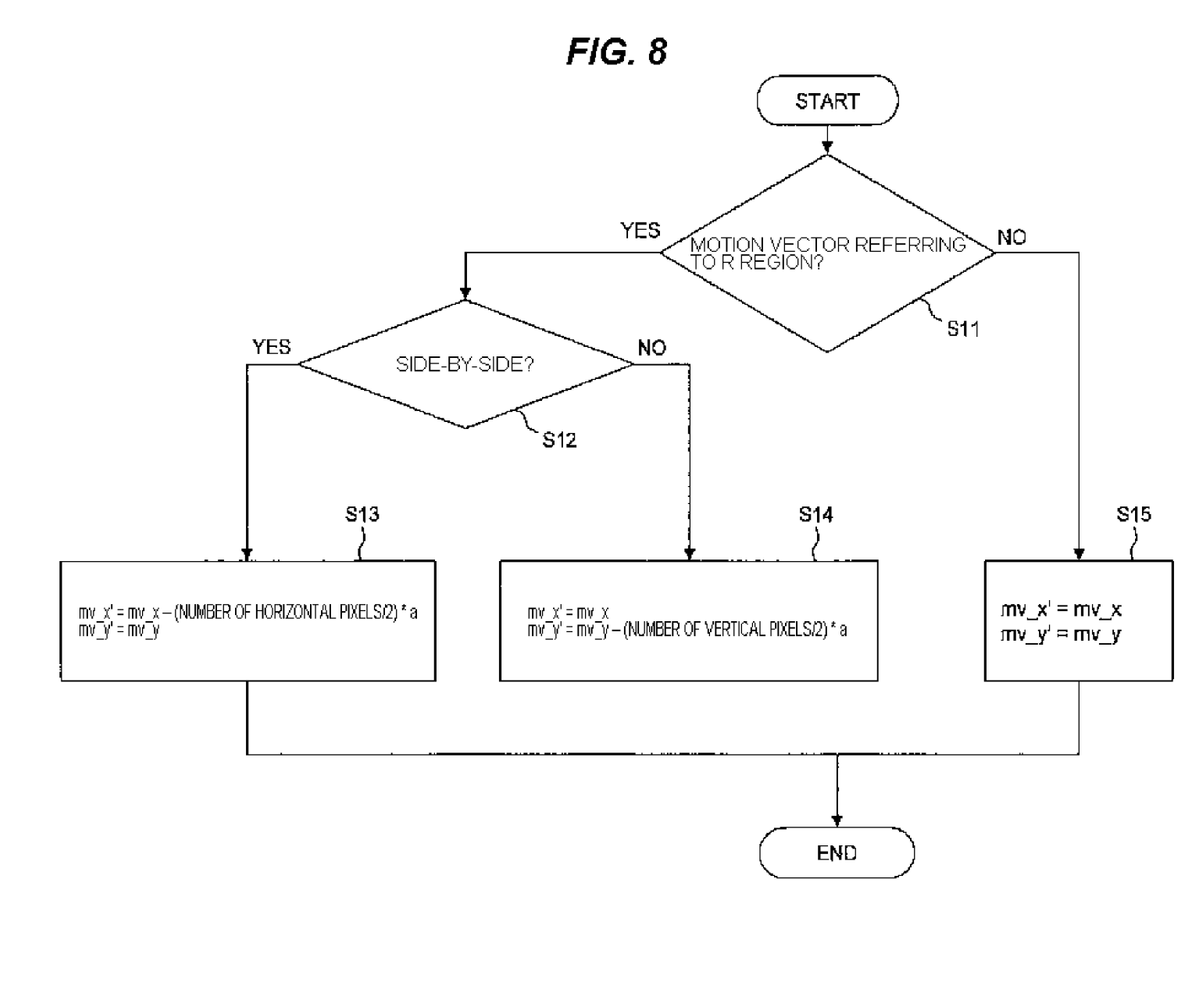
FIG. 8 is a flow chart of a motion vector shift in a 3-dimensional video stream.

FIG. 8 illustrates a flow chart of motion vector shift.

The MV shifter 108 first determines whether or not the motion vector is referring to the R-region (S11). If it is determined that the motion vector is referring to the R-region (YES), it is determined whether or not the input 3-dimensional video stream has been encoded in side-by-side system (S12). The content of the correction differs (S13, S14, S15) depending on whether or not the motion vector is referring to the R-region in the determination at step S11 and, further, whether or not the input 3-dimensional video stream has been encoded in a side-by-side system.

Figure 6A:
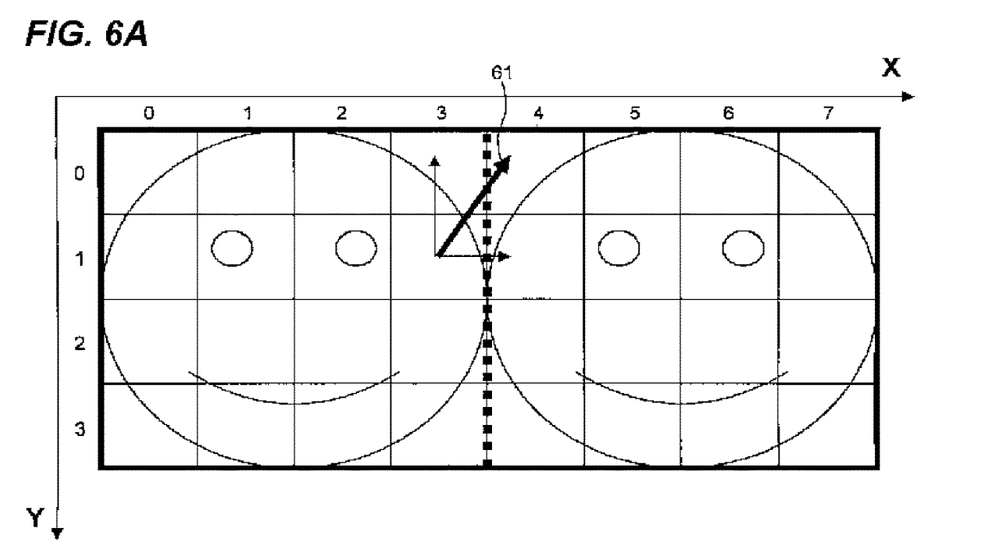
FIG. 6 is an explanatory diagram of a motion vector shift in a 3-dimensional video stream encoded in a side-by-side system.
Figure 6B:
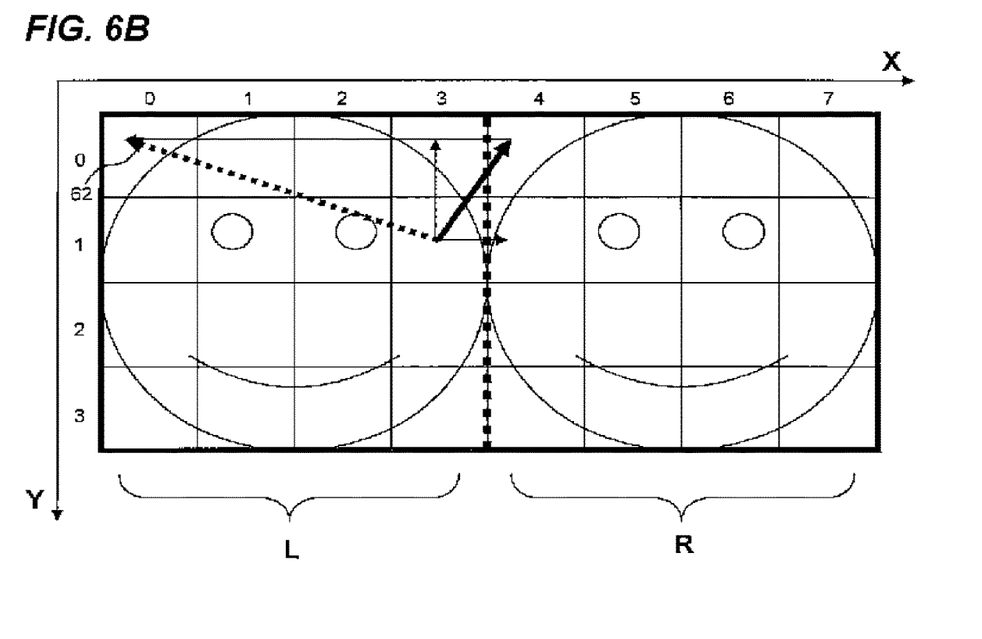

In the case where the input 3-dimensional video stream has been encoded in a side-by-side system, for example, with a motion vector 61 of a particular macro block (x=3, y=1) in the L-region being denoted as MV (mv_x, mv_y) as shown in (A) of FIG. 6, for example, a motion vector MV' (mv_x', mv_y') shown by the dashed line 62 in (B) of FIG. 6 is acquired if the motion vector 61 is referring to the R-region. Here, "mv_x'" is indicated by formula 1, and "mv_y'" is indicated by formula 2.

$$mv\_x' = mv\_x - (x\_pic\_size/2)*a \qquad \text{[Formula 1]}$$

Here, "x_pic_size" expresses the number of horizontal MBs. The symbol "*" means multiplication. The symbol "a" expresses a coefficient in accordance with precision of the motion vector. The coefficient according to the precision of the motion vector is given such as a=1 for integer pixel units, a=2 for ½ pixel units, and a=4 for ¼ pixels units.

$$mv\_y' = mv\_y \qquad \text{[Formula 2]}$$

For example, since the number of horizontal MB (x_pic_size) becomes "8" and mv_x of the motion vector 61 is "4" when the size of an image including the L (left) image and the R (right) image is 8×4 (number of horizontal MB=8, number of vertical MB=4), the motion vector MV' (mv_x', mv_y') indicated by the dashed line 62 for the case of a=1 becomes MV' (0,0). That is, a place corresponding to the R-region in the L-region is regarded as the place most resembling the predicted image indicated by the original motion vector, to which the motion vector is shifted and corrected. Correcting the motion vector in this manner prevents an undecoded region from being referred to.

In addition, if the input 3-dimensional video stream has been encoded in a top-and-bottom system, it is determined not to be a side-by-side system (NO) in the determination step S12 and corrected as follows.

Figure 7A:
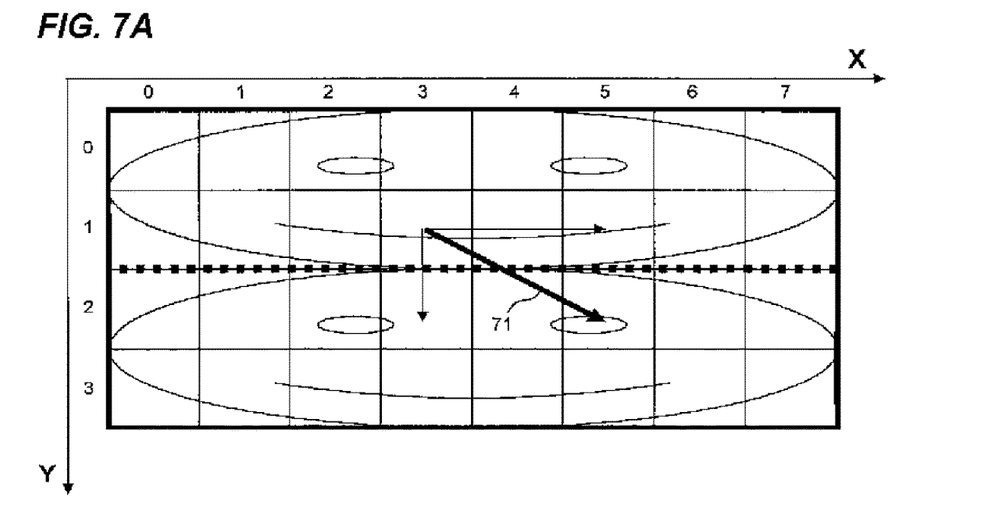
FIG. 7 is an explanatory diagram of a motion vector shift in a 3-dimensional video stream encoded in a top-and-bottom system.
Figure 7B:
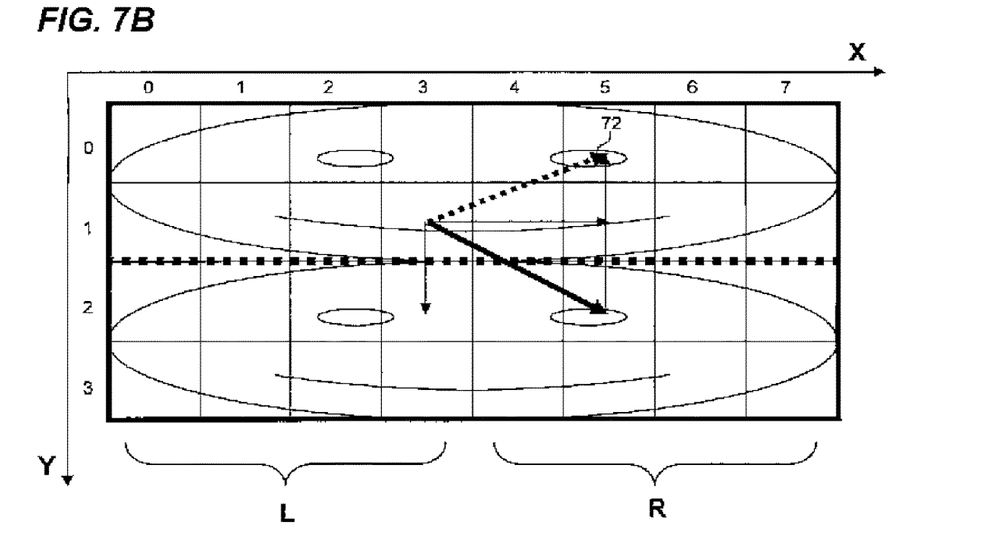

With a motion vector 71 of a particular macro block (x=3, y=1 s) being denoted as MV (mv_x, mv_y) as shown in (A) of FIG. 7, for example, a motion vector MV'(mv_x', mv_y') shown by the dashed line 72 in (B) of FIG. 7 is acquired if the motion vector 71 is referring to a bottom region. Here, "mv_x'" is indicated by formula 3 and "mv_y'" is indicated in formula 4.

$$mv\_x'=mv\_x \quad \text{[Formula 3]}$$

$$mv\_y'=mv\_y-(y\_pic\_size/2)*a \quad \text{[Formula 4]}$$

That is, a place corresponding to the bottom region in the top region is regarded as the place most resembling the predicted image indicated by the original motion vector, to which the motion vector is shifted and corrected.

If it is determined in the determination at step S11 that the motion vector is not referring to the R-region (NO), the motion vector is not corrected. In this case, "mv_y'" and "mv_x'" are expressed by formulas 2 and 3, respectively.

According to the First Embodiment, the following effect is exhibited.

(1) Since the macro block selector 103 performs block selection, the decoding unit 110 skips processing of macro blocks which are not supposed to be 2-dimensionally displayed. Accordingly, decoding time can be reduced by about ½ in comparison with the case of reproducing only the left-eye image after decoding all the frames, whereby 2-dimensional display of a 3-dimensional video stream can be efficiently provided.

(2) In a case where decoding of macro blocks is skipped by selecting blocks in the macro block selector 103, leaving the motion vector 61 in the L-region referring to the R-region may cause image degradation due to reference to an undecoded region, as shown in (A) of FIG. 6. In contrast to this, image degradation caused by reference to an undecoded region can be avoided by shifting and correcting the motion vector as described above.

Although the invention made by the inventors has been specifically described based on embodiments, it is needless to say that the invention is not limited thereto and may be modified in various ways within a range that does not deviate from the spirit thereof.

For example, the image display device 10 shown in FIG. 1 may have the 2D/3D display determination unit 300 omitted therefrom and may be configured to be dedicated for 2-dimensional display. When only 2-dimensional display is assumed, the decoding unit 110 skips processing of macro blocks which are not supposed to be 2-dimensionally displayed either in a side-by-side system or a top-and-bottom system, and therefore memory capacity of the memory 107 can be made smaller than in the case shown in FIG. 1.

What is claimed is:

1. A video decoding device for decoding a 3-dimensional video stream having a right-eye macro block group including a plurality of macro blocks for forming a right-eye image, and a left-eye macro block group including a plurality of macro blocks for forming a left-eye image, formed on the same frame, the video decoding device comprising:
 a macro block selector circuit for selecting, as objects to be decoded, only macro blocks belonging to a single macro block group, the macro block group being the left-eye macro block group or the right-eye macro block group;
 a decoding circuit for decoding only the selected macro blocks belonging to the single macro block group, and not decoding the macro blocks belonging to the other macro block group; and
 a motion vector shift circuit for correcting, when a motion vector of a macro block selected by the macro block selector circuit refers to a macro block belonging to the other macro block group that is not decoded by the decoding circuit, the reference indicated by the motion vector to be within a selected macro block belonging to the single macro block group that is decoded by the decoding circuit.

2. The video decoding device according to claim 1, wherein the decoding circuit includes an inverse quantizer which performs inverse quantization, an inverse discrete cosine transformer which performs inverse discrete cosine transformation on the output of the inverse quantizer, a motion compensator which extracts decoded data to acquire a predicted image, and an adder for adding the output of the motion compensator to the output of the inverse discrete cosine transformer.

3. The video decoding device according to claim 2, wherein the macro block selector circuit:
 determines whether an input 3-dimensional video stream has been encoded in a side-by-side system or a top-and-bottom system, and
 in accordance with the determination result, specifies the single macro block group and sequentially selects, as objects to be decoded, macro blocks belonging to the single macro block group.

4. The video decoding device according to claim 3,
 wherein the motion vector shift circuit performs first determination processing to determine whether or not a motion vector of a macro block selected by the macro block selector circuit is referring to a macro block belonging to the right-eye macro block group,
 wherein the motion vector shift circuit performs second determination processing to determine whether or not the input 3-dimensional video stream has been encoded in a side-by-side system or a top-and-bottom system, and
 wherein, when the macro block selected by the macro block selector circuit belongs to the left-eye macro block group and the motion vector of the macro block selected by the macro block selector circuit refers to a macro block that belongs to the right-eye macro block group, the motion vector shift circuit corrects, in accordance with the result of the first determination processing and the second determination processing, the reference indicated by the motion vector to be within a macro block that belongs to the left-eye macro block group.

5. The video decoding device according to claim 4, wherein a variable-length decoder is disposed, in a preceding stage of the macro block selector circuit, for performing variable-length decoding processing in which partitions of the macro block can be analyzed.

6. An image display device including the video decoding device according to claim 5, and a display unit capable of providing 2-dimensional display of the decoding result of the video decoding device.

7. A video decoding device receiving an input 3-dimensional video stream having a right-eye macro block group including a plurality of macro blocks for forming a right-eye image, and a left-eye macro block group including a plurality of macro blocks for forming a left-eye image, formed on the same frame, the video decoding device comprising:

a macro block selector circuit determining macro blocks, as objects to be decoded, belonging to a single macro block group, the single macro block group being the left-eye macro block group or the right-eye macro block group;

a decoding circuit receiving only the determined macro blocks; and a motion vector shift circuit receiving a first motion vector for one of the determined macro blocks to output a second motion vector, wherein:

the motion vector shift circuit supplies the second motion vector to the decoding circuit without shifting and correcting the first motion vector, when the first motion vector refers to macro blocks belonging to the single macro block group, and the motion vector shift circuit supplies the second motion vector to the decoding circuit with shifting and correcting the first motion vector, when the first motion vector refers to macro blocks belonging to the other macro block group.

8. The video decoding device according to claim 7, wherein the decoding circuit acquires a predicted image based on the second motion vector supplied by the motion vector shift circuit.

9. The video decoding device according to claim 8, wherein the decoding circuit includes an inverse quantizer which performs inverse quantization, an inverse discrete cosine transformer which performs inverse discrete cosine transformation on the output of the inverse quantizer, a motion compensator which extracts decoded data belonging to the single macro block group based on the second motion vector to acquire the predicted image, and an adder for adding the output of the motion compensator to the output of the inverse discrete cosine transformer.

10. The video decoding device according to claim 7, wherein the macro block selector circuit receives a control signal which instructs 2-dimensional or 3-dimensional display, the motion vector shift circuit checks if the first motion vector refers to the macro blocks belonging to the other macro block group, when the control signal instructs 2-dimensional display, and the motion vector shift circuit doesn't check if the first motion vector refers to the macro blocks belonging to the other macro block group, when the control signal instructs 3-dimensional display.

11. The video decoding device according to claim 7, wherein the macro blocks belonging to the other macro block group are not supplied to the decoding circuit.

12. An image display device comprising:

the video decoding device according to claim 7;

a 2-dimensional or 3-dimensional display determination unit capable of providing a control signal which instructs 2-dimensional or 3-dimensional display to the decoding device; and a display unit, wherein the decoding device provides video signals to the display unit for 2-dimensional or 3-dimensional displaying.

* * * * *